United States Patent
Okabe

(10) Patent No.: US 8,768,056 B2
(45) Date of Patent: Jul. 1, 2014

(54) IMAGE PROCESSING SYSTEM AND IMAGE PROCESSING METHOD

(75) Inventor: Masashi Okabe, Tokyo (JP)

(73) Assignee: Olympus Corporation, Tokyo (JP)

( * ) Notice: Subject to any disclaimer, the term of this patent is extended or adjusted under 35 U.S.C. 154(b) by 51 days.

(21) Appl. No.: 13/483,179

(22) Filed: May 30, 2012

(65) Prior Publication Data

US 2012/0314951 A1 Dec. 13, 2012

(30) Foreign Application Priority Data

Jun. 7, 2011 (JP) ................................. 2011-127518

(51) Int. Cl.
*G06K 9/34* (2006.01)
*G06K 9/00* (2006.01)

(52) U.S. Cl.
USPC .......................................... 382/173; 382/128

(58) Field of Classification Search
USPC .................. 382/173, 128, 133, 218, 219, 103
See application file for complete search history.

(56) References Cited

U.S. PATENT DOCUMENTS

| | | | | |
|---|---|---|---|---|
| 5,150,432 A | * | 9/1992 | Ueno et al. | 382/250 |
| 7,636,454 B2 | * | 12/2009 | Lee et al. | 382/103 |
| 7,822,282 B2 | * | 10/2010 | Kajiwara et al. | 382/240 |
| 8,305,434 B2 | * | 11/2012 | Nakatsuka et al. | 348/79 |
| 2010/0142792 A1 | * | 6/2010 | Sakaguchi et al. | 382/132 |

FOREIGN PATENT DOCUMENTS

JP          2001-45426          2/2001

* cited by examiner

*Primary Examiner* — Yon Couso
(74) *Attorney, Agent, or Firm* — Scully, Scott, Murphy & Presser, P.C.

(57) ABSTRACT

An image processing system is provided that includes: an image data storage section that stores image data of a consecutive plurality of frames; a display section that displays image data that is stored; a region-of-interest setting section that sets a region of interest in the displayed image data; a change amount detection section that, with respect to the region of interest that is set, compares image data of adjacent frames stored in the image data storage section and detects a change amount therebetween; a change determination section that determines whether the detected change amount exceeds a predetermined threshold value; and an index storage section that stores image data of a frame that is determined to exceed the predetermined threshold value by the change determination section as an index.

6 Claims, 15 Drawing Sheets

IMAGE PROCESSING SYSTEM AND IMAGE PROCESSING METHOD

CROSS-REFERENCE TO RELATED APPLICATIONS

This application is based on Japanese Patent Application No. 2011-127518, the contents of which are incorporated herein by reference.

TECHNICAL FIELD

The present invention relates to an image processing system and an image processing method for processing image data.

BACKGROUND ART

In a microscope system, after capturing a moving image or performing time-lapse imaging of a long time period, operations such as observation and assessment are performed after determining a portion of interest by reviewing the entire moving image. To determine the portion of interest, it is necessary to check the contents of the moving image while playing back the moving image at a speed that is faster than the normal playback speed or to play back the moving image after fast-forwarding to an appropriate position. Consequently, there has been the problem that such operations require a large amount of time.

To solve this problem, a moving image processing system is known that automatically adds an index to a moving image to facilitate an operation to check the contents of the moving image, and thereby assist the user in ascertaining the contents of the moving image (for example, see PTL1).

CITATION LIST

Patent Literature

{PTL 1}
Japanese Unexamined Patent Application, Publication No. 2001-45426

SUMMARY OF INVENTION

Technical Problem

According to the moving image processing apparatus disclosed in PTL 1, among the frames of a recorded moving image, automatic detection of a frame in which there is a large change in the overall image is realized by adding an index to a frame in which a change amount in the brightness at a plurality of measurement points that are arranged in a lattice shape in an equally spaced manner is greater than or equal to a threshold value.

The present invention provides an image processing system and an image processing method that can detect image data of a frame that is desired by the user with high accuracy, and that enable efficient observation and assessment of a moving image.

Solution to Problem

The present invention adopts the following solutions.

A first aspect of the present invention is an image processing system that includes: an image data storage section that stores image data of a consecutive plurality of frames; a display section that displays the image data that is stored in the image data storage section; a region-of-interest setting section that sets a region of interest in the image data that is displayed on the display section; a change amount detection section that, with respect to the region of interest that is set by the region-of-interest setting section, compares image data of adjacent frames that is stored in the image data storage section and detects a change amount therebetween; a determination section that determines whether the change amount that is detected by the change amount detection section exceeds a predetermined threshold value; and an index storage section that stores image data of a frame that is determined to exceed the predetermined threshold value by the determination section as an index.

A second aspect of the present invention is an image processing method that includes: an image data storage step of storing image data of a consecutive plurality of frames; a display step of displaying the image data that is stored in the image data storage step; a region of interest setting step of setting a region of interest in the image data that is displayed in the display step; a change amount detection step of, with respect to the region of interest that is set in the region of interest setting step, comparing image data of adjacent frames that is stored in the image data storage step and detecting a change amount therebetween; a determination step of determining whether the change amount that is detected in the change amount detection step exceeds a predetermined threshold value; and an index storage step of storing image data of a frame that is determined to exceed the predetermined threshold value in the determination step as an index.

BRIEF DESCRIPTION OF DRAWINGS

FIG. 1 is a functional block diagram of a microscope system according to a first embodiment.
FIG. 2 is a flowchart that illustrates processing that is executed by the microscope system shown in FIG. 1.
FIG. 3 is an example of a screen that is displayed on a display section of the microscope system shown in FIG. 1.
FIG. 4 is an example of a screen that is displayed on a display section of a microscope system according to a second embodiment.
FIG. 5 is a functional block diagram of a microscope system according to a third embodiment.
FIG. 6 is a flowchart that illustrates processing that is executed by the microscope system shown in FIG. 5.
FIG. 7 is an example of a screen that is displayed on a display section of the microscope system shown in FIG. 5.
FIG. 8 is a functional block diagram of a microscope system according to a fourth embodiment.
FIG. 9 is a flowchart that illustrates processing that is executed by the microscope system shown in FIG. 8.
FIG. 10 is an example of a screen that is displayed on a display section of the microscope system shown in FIG. 8.

FIG. 11 is an example of a screen that is displayed on a display section of a microscope system according to a fifth embodiment.
FIG. 12 is a functional block diagram of a microscope system according to a sixth embodiment.
FIG. 13 is a flowchart that illustrates processing that is executed by the microscope system shown in FIG. 12.
FIG. 14 is an example of a screen that is displayed on a display section of the microscope system shown in FIG. 12.
FIG. 15 is a view that illustrates a problem of the conventional microscope system.

DESCRIPTION OF EMBODIMENTS

{First Embodiment}

Hereunder, an image processing system according to a first embodiment of the present invention is described with reference to FIG. 1 to FIG. 3. According to the present embodiment, an example is described in which an image processing system according to the present invention is applied to a microscope system.

Figure 1:
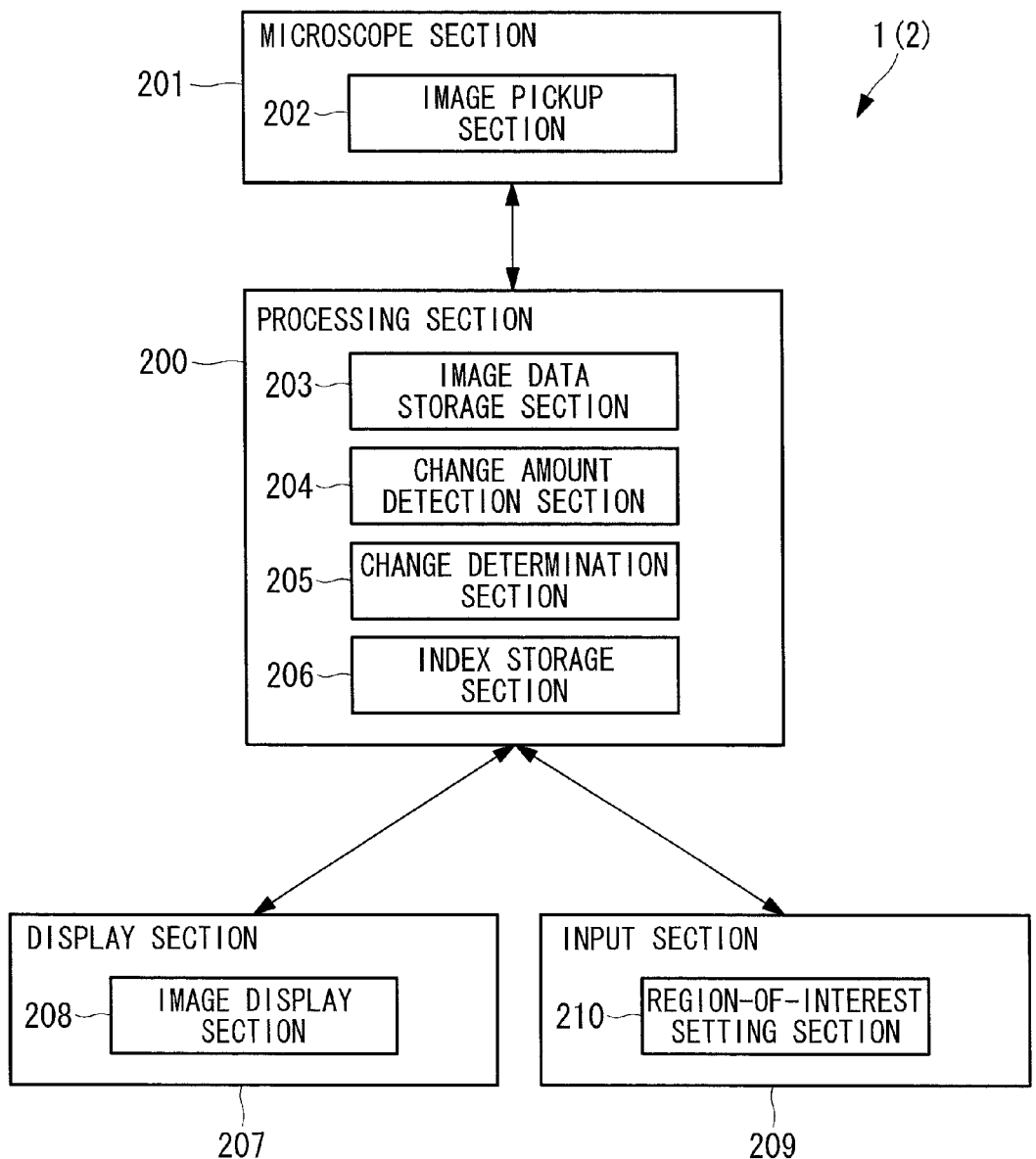
{FIG. 1}

As shown in FIG. 1, a microscope system 1 according to the present embodiment includes a microscope section 201, a processing section 200, a display section 207, and an input section 209.

The microscope section 201, the display section 207, and the input section 209 are each connected to the processing section 200. The microscope system 1 is configured so that a user performs operations to set a parameter or select a moving image or the like through the input section 209. A setting value of a parameter that is input to the input section 209 or image data that is acquired by the microscope section 201 is output to the display section 207 through the processing section 200.

The input section 209 includes a region-of-interest setting section 210 as input means that inputs a region of interest that a user focuses attention on, and is configured to centrally control the input of parameters. For example, a keyboard, a mouse, a joystick or the like can be used as the specific form of the input section 209, although the present invention is not limited to these examples.

The display section 207 includes an image display section 208 such as, for example, a display. The display section 207 is configured to display a setting value of a parameter that is input to the input section 209 and image data that is acquired by the microscope section 201.

The processing section 200 processes image data, and includes an image data storage section 203, a change amount detection section 204, a change determination section (determination section) 205, and an index storage section 206 as functions. For example, a PC (personal computer) can be used as the specific form of the processing section 200, although the present invention is not limited thereto.

The image data storage section 203 is, for example, a hard disk, and is storage means that stores image data acquired by the microscope section 201.

The change amount detection section 204 calculates a change amount between adjacent frames based on information that is stored in the image data storage section 203. Specifically, the change amount detection section 204 detects a change amount in brightness or the like between adjacent frames with respect to a region of interest that has been set in the input section 209. In this case, the change amount may be an average value of the brightness in the region of interest or may be a sum value of the brightness in the region of interest.

The change determination section 205 compares a condition that is previously set in the input section 209 and a detection result that is detected by the change amount detection section 204, and determines whether a change has occurred between adjacent frames. Specifically, when a change amount in brightness that is detected by the change amount detection section 204 is greater than a threshold value that is previously set in the input section 209, the change determination section 205 determines that a change has occurred between adjacent frames.

The index storage section 206 is configured to add an index to a frame in which a change is determined to have occurred by the change determination section 205, and to store a frame number of the image data to which the index has been added.

For example, an upright microscope or an inverted microscope or the like can be used as the microscope section 201, although the microscope section 201 is not limited thereto. The microscope section 201 includes an image pickup section 202 as means that picks up images of an observation target and stores a plurality of image data items that are obtained by an image pickup operation in the image data storage section 203. A known photodetector such as, for example, a CCD camera, a CMOS camera, a video camera, or a multiplier phototube can be used as the image pickup section 202, although the image pickup section 202 is not limited thereto.

The operations of the microscope system 1 having the above configuration are described hereunder.

Figure 2:
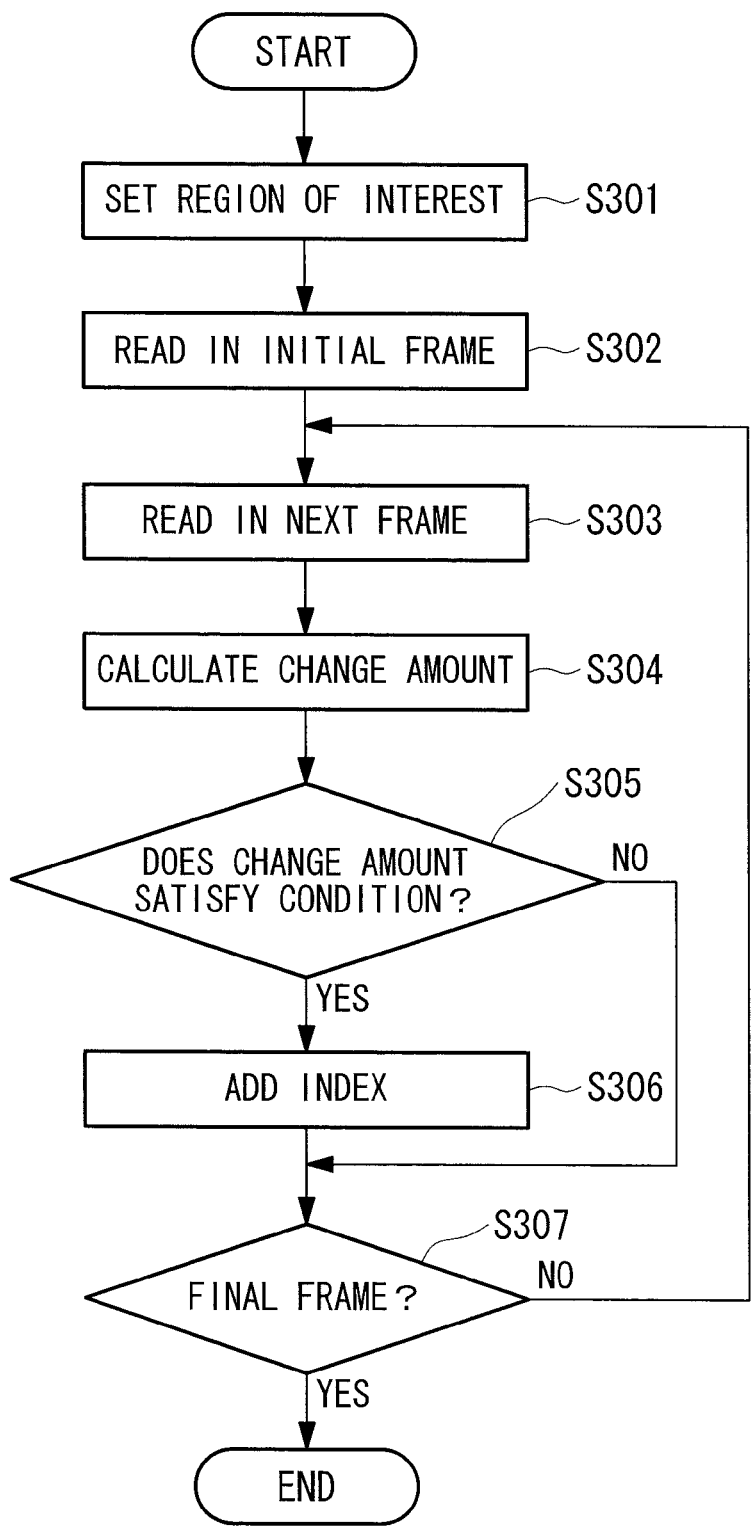
{FIG. 2}

FIG. 2 is a flowchart that illustrates processing that is executed in the microscope system 1 of the present embodiment. Hereunder, the processing executed in the microscope system 1 of the present embodiment will be described in accordance with FIG. 2.

First, in step S301, setting of a region of interest is performed.

Here, a user sets a region of interest which the user is focusing attention on in the image data by means of the region-of-interest setting section 210.

More specifically, as shown in FIG. 1, among a plurality of image data items stored on a hard disk as the image data storage section 203, image data of a first frame is retrieved and displayed on a display as the image display section 208. The user checks the image of the first frame that is displayed on the image display section 208, and as shown in FIG. 3, sets a region of interest 402 in an output image 401 by operating a mouse as the region-of-interest setting section 210. The size of the region of interest 402 can be freely set by operating the mouse. In this connection, reference numeral 403 in FIG. 3 denotes a change over time in a difference value of the brightness between adjacent frames.

Although in this case an example is described in which the image data storage section 203 is a hard disk, the image display section 208 is a display, and the region-of-interest setting section 210 is a mouse, the present invention is not limited thereto.

Figure 3:
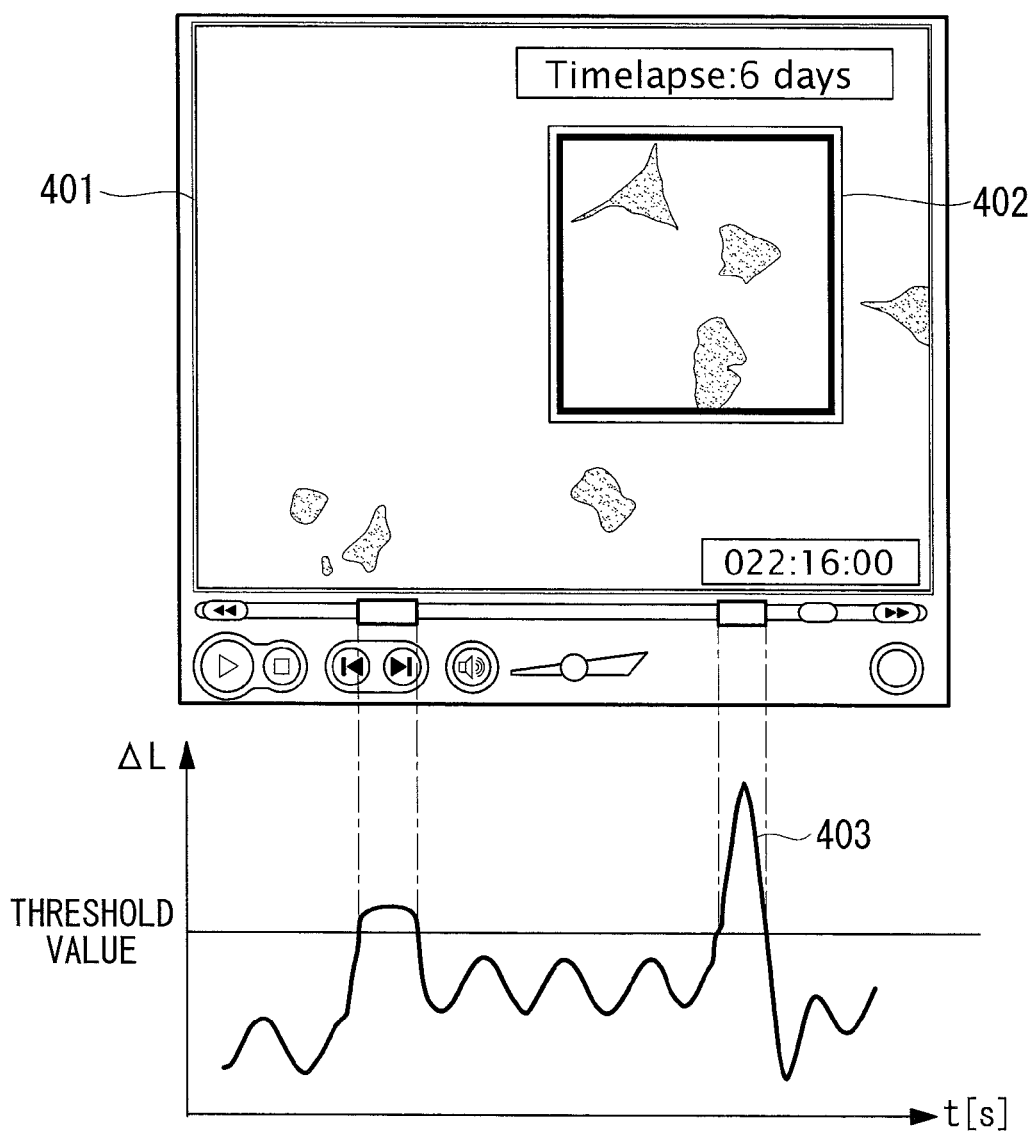
{FIG. 3}

Further, although a quadrilateral region is specified as the region of interest 402 in FIG. 3, the present invention is not limited thereto. Any shape such as, for example, an elliptical shape or a polygonal shape may be specified as the region of interest as long as the region is clearly specified.

Next, in step S302, reading in of an initial frame is performed.

Here, the change amount detection section 204 reads in the first frame of image data that is stored on the hard disk as the image data storage section 203.

Subsequently, in step S303, reading in of a next frame is performed.

Here, in addition to the image data of the frame (Nth) that has already been read out, the change amount detection section 204 reads in image data of the next frame (N+1th) from the image data storage section 203.

Next, in step S304, calculation of a change amount is performed.

Here, the change amount detection section 204 calculates a change amount of the region of interest 402 between the image data of the Nth frame and the N+1th frame that have been read in. An average value of differences between brightness values for each pixel may be mentioned as an example of the change amount, although the present invention is not limited thereto.

Next, in step S305, it is determined whether or not the calculated change amount satisfies a condition.

Specifically, the change determination section 205 determines whether or not the change amount that is detected by the change amount detection section 204 exceeds a predetermined threshold value. If the condition is satisfied (if the change amount exceeds the predetermined threshold value), the processing moves to step S306. In contrast, if the condition is not satisfied (if the change amount is equal to or less than the predetermined threshold value), the processing moves to step S307. In this case, for example, when the change amount is an average value of differences between brightness values for each pixel, a condition that the change amount is greater than or equal to 50 or is less than or equal to 40 or the like can be considered as the above described condition, although the present invention is not limited thereto.

Next, in step S306, addition of an index is performed.

Specifically, the index storage section 206 stores the current frame that has been read out and for which a calculation has been performed, that is, a frame for which the change amount detected by the change amount detection section 204 satisfies the aforementioned condition, and also adds an index thereto. As the storage method, for example, a method is available that stores a frame number N of the current frame that has been read out, although the present invention is not limited thereto.

Next, in step S307, it is determined whether or not the current frame is the final frame.

Here, if it is determined that the frame that has been read into the change amount detection section 204 is the final frame, the processing is ended. In contrast, if the current frame is not the final frame, the processing moves to step S303 to continue calculation of a change amount.

As described above, according to the microscope system 1 that includes the image processing system of the present embodiment, image data of a consecutive plurality of frames is stored in the image data storage section 203, and the image data is displayed on the display section 207. Subsequently, by means of the region-of-interest setting section 210, the user sets a region of interest which the user is focusing attention on in the image data that is displayed on the display section 207. With respect to the region of interest that is set in this manner, image data of adjacent frames is compared and a change amount between the adjacent frames is detected by the change amount detection section 204. Thereafter, image data of a frame in which a change amount is determined to exceed a predetermined threshold value by the change determination section 205 is stored as an index in the index storage section 206.

Thus, an index can be added to image data of a frame in which a change has occurred in a region of interest on which the user is focusing attention. As a result, image data to which an index has been added, that is, image data of a frame that the user wishes to focus attention on, can be automatically detected with high accuracy, and the detected image data can be displayed on the display section 207. It is thereby possible for the user to efficiently carry out observation and assessment of a moving image.

{Second Embodiment}

Figure 4:
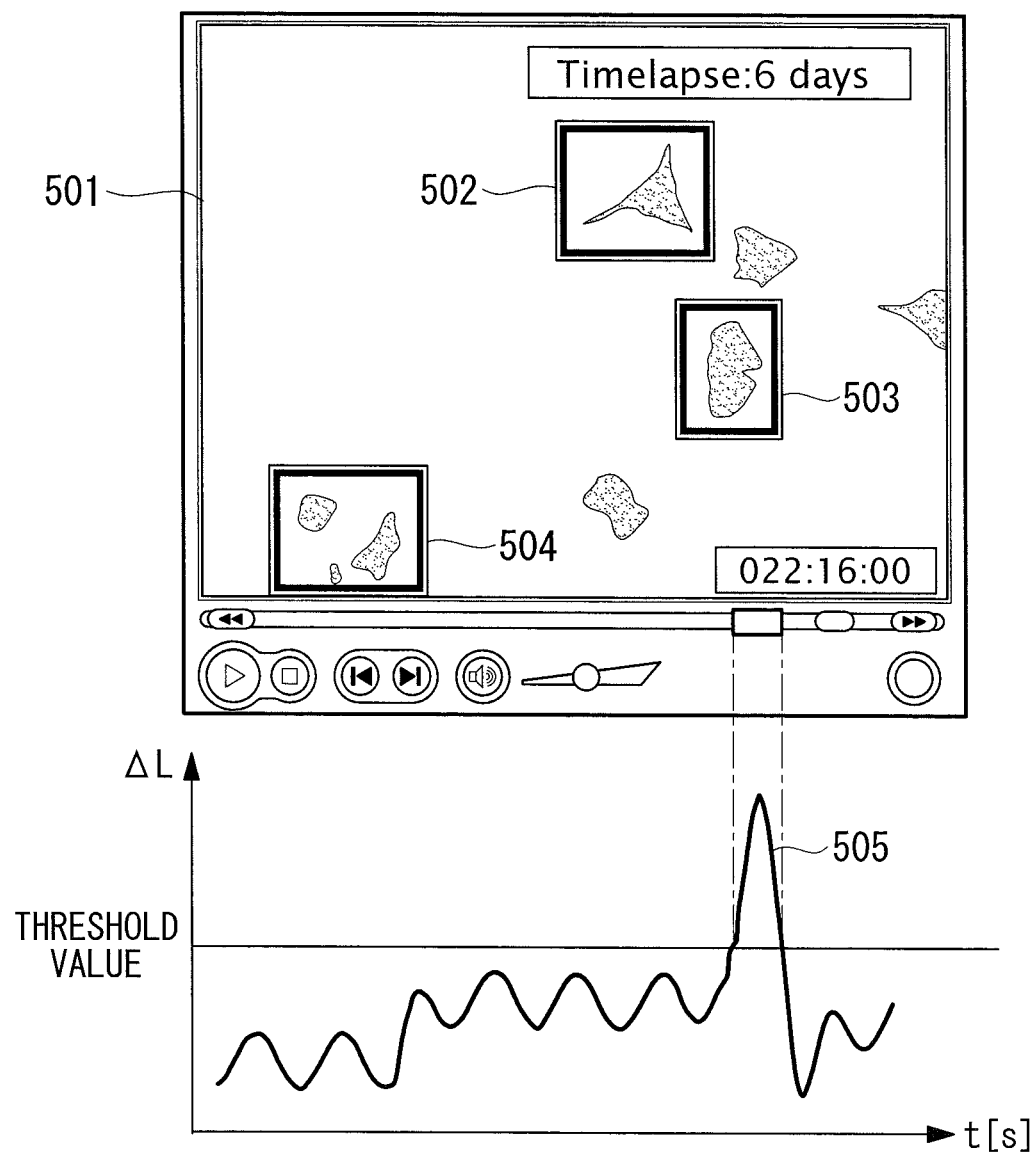
{FIG. 4}

Next, a microscope system including an image processing system according to a second embodiment of the present invention is described referring to FIG. 4. Hereunder, with regard to a microscope system 2 of the present embodiment, a description of points that are common with the microscope system 1 of the first embodiment is omitted, and differences with respect to the microscope system 1 of the first embodiment are mainly described.

The configuration of the microscope system 2 of the present embodiment is the same as in the configuration diagram of the microscope system 1 of the first embodiment, and hence the configuration of the microscope system 2 is as described above with reference to FIG. 1.

Further, since processing in the microscope system 2 of the present embodiment is approximately the same as the processing in the microscope system 1 of the first embodiment, only changes relative to the processing in the microscope system 1 of the first embodiment are described hereunder with reference to FIG. 2.

According to the microscope system 2 of the present embodiment, a plurality of regions of interest are set in step S301 as described below.

In this case, the user specifies a plurality of regions of interest on which the user is focusing attention in image data of a single frame by means of the region-of-interest setting section 210.

More specifically, first, as shown in FIG. 4, a first frame of image data that is stored on a hard disk as the image data storage section 203 is retrieved and displayed on a display as the image display section 208. The user checks the image of the first frame that is displayed on the image display section 208, and sets a plurality of regions of interest 502, 503, and 504 in an output image 501 by operating a mouse as the region-of-interest setting section 210. In this connection, reference numeral 505 in FIG. 4 denotes a change over time in a difference value of the brightness between adjacent frames.

The processing thereafter is the same as in the microscope system 1 of the first embodiment. With respect to each of the plurality of regions of interest 502, 503, and 504 that are set by the user, a change amount between adjacent frames is detected, and when it is determined that a change has occurred, an index is added to the image data of the relevant frame.

Although an example has been described here in which the image data storage section 203 is a hard disk, the image display section 208 is a display, and the region-of-interest setting section 210 is a mouse, the present invention is not limited thereto.

Further, although quadrilateral regions are specified as the regions of interest 502, 503, and 504 in FIG. 4, the present invention is not limited thereto. Any shape such as, for example, an elliptical shape or a polygonal shape may be specified as a region of interest as long as the region is clearly specified.

As described above, according to the microscope system 2 that includes the image processing system of the present embodiment, in a case where a plurality of regions of interest exist on which the user is focusing attention, an index can be added to image data of a frame in which a change occurred within the respective regions of interest. As a result, for each of the plurality of regions of interest, image data of a frame the user wishes to focus attention on can be automatically detected with high accuracy, and the detected image data can be displayed on the display section. It is thereby possible for the user to efficiently carry out observation and assessment of a moving image.

{Third Embodiment}

Next, a microscope system including an image processing system according to a third embodiment of the present invention is described below referring to FIG. 5 to FIG. 7. Hereunder, with regard to a microscope system 3 of the present embodiment, a description of points that are common with the microscope systems of the respective embodiments described above is omitted, and differences with respect to the microscope systems of the foregoing embodiments are mainly described.

Figure 5:
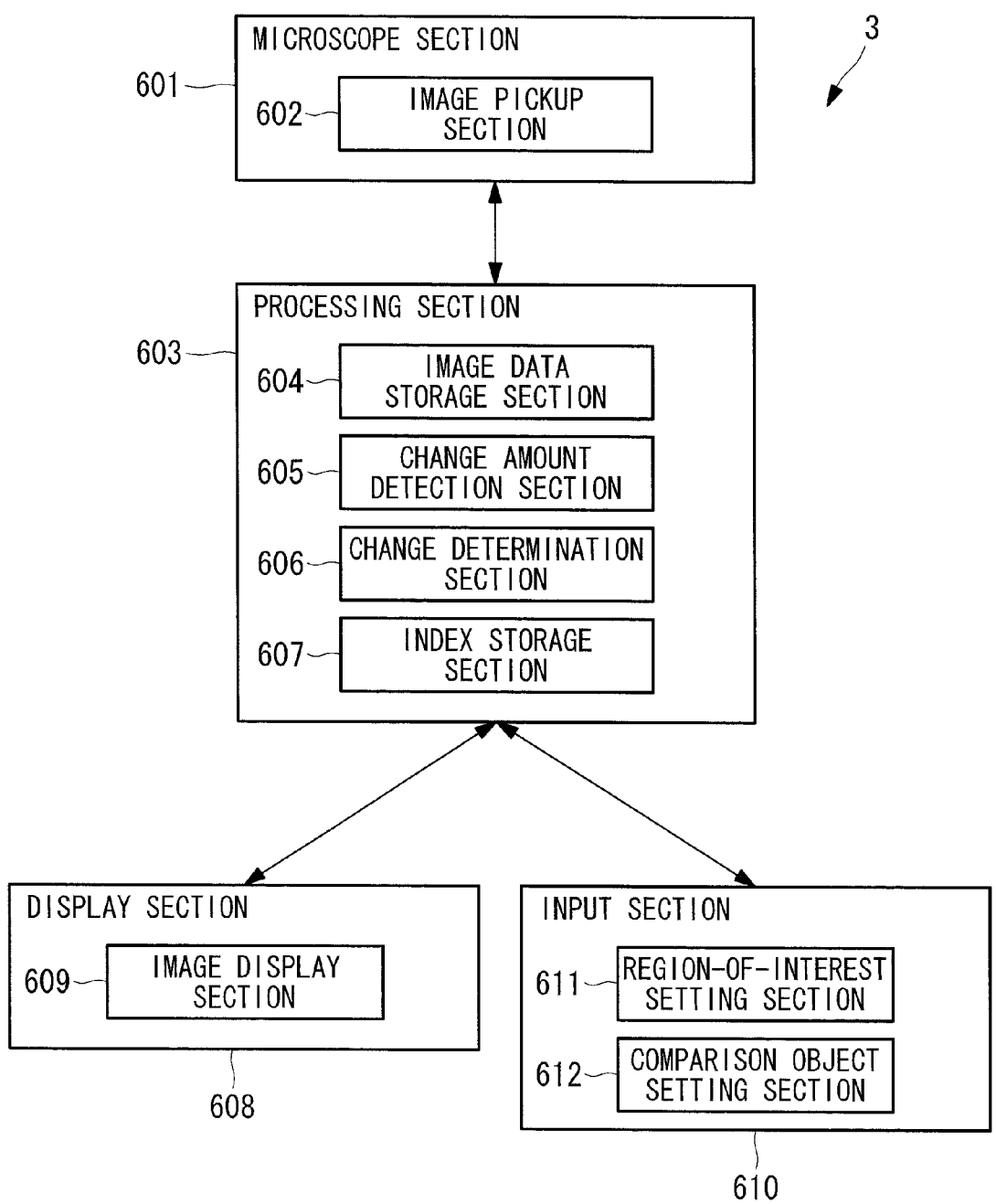
{FIG. 5}

As shown in FIG. 5, the configuration of the microscope system 3 of the present embodiment is approximately the same as the configuration of the microscope system of the first embodiment (see FIG. 1). The differences between the configuration of the microscope system 3 and the microscope system of the first embodiment are described below.

As shown in FIG. 5, in the microscope system 3 of the present embodiment, in addition to a region-of-interest setting section 611, an input section 610 has a comparison object setting section 612 that sets an object with which to perform a comparison at the change amount detection section 605.

For example, a keyboard, a mouse, a joystick or the like can be used as the comparison object setting section 612, although the present invention is not limited thereto.

An average value or a sum value of differences in a brightness value Y or RGB values of each pixel or the like can be considered as examples of a comparison object, although the present invention is not limited thereto. Further, in a case where an observation object that is present inside a region of interest is a cell or the like, the size of the cell or an amount of movement thereof may also be used. It is sufficient that a specific factor is set with which a change with respect to prior and subsequent frames can be determined.

The operations of the microscope system 3 having the above described configuration are described below.

Figure 6:
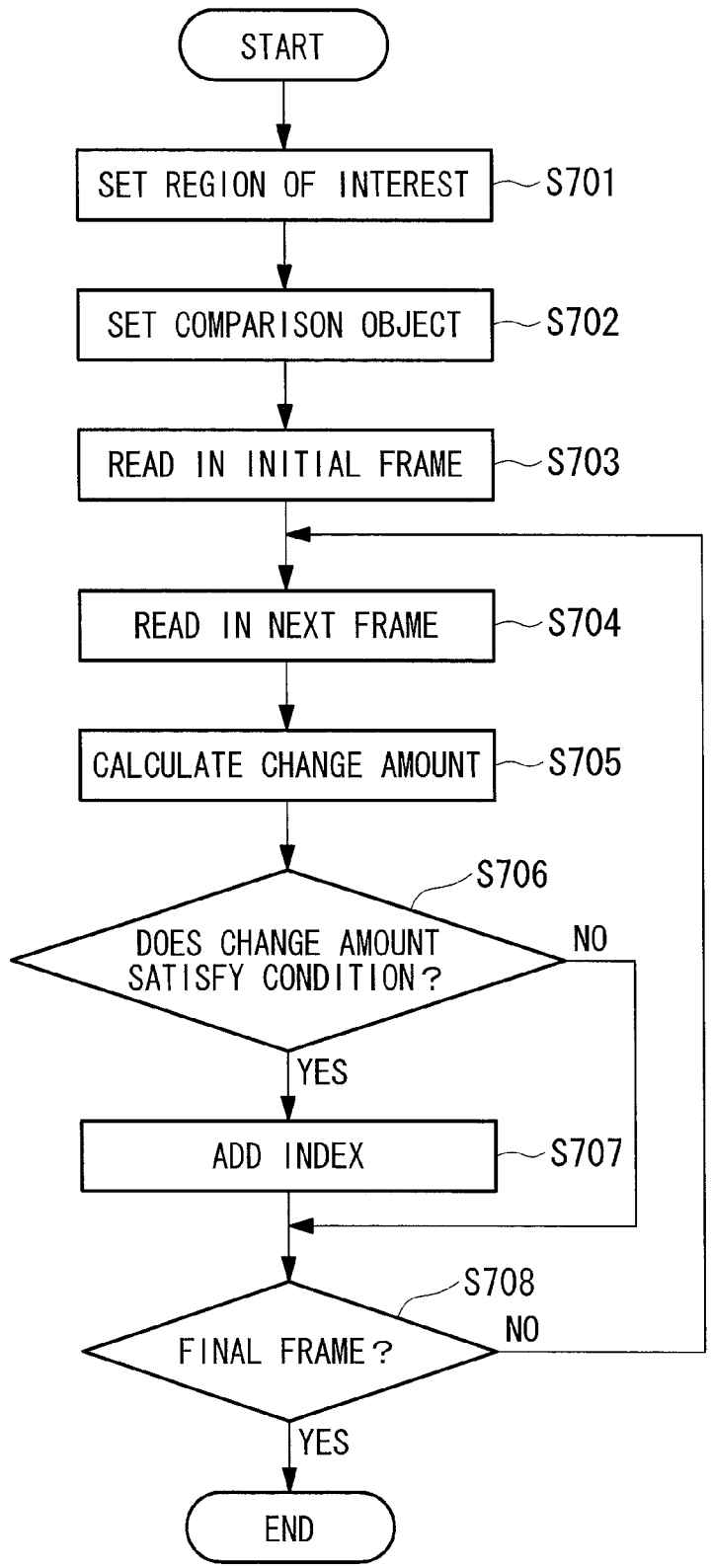
{FIG. 6}

FIG. 6 is a flowchart that illustrates processing that is executed in the microscope system of the present embodiment. Differences between the processing of the microscope system 3 of the present embodiment in this case and the processing executed by the microscope system 1 of the first embodiment are described hereunder.

As shown in FIG. 6, in step S702, setting of a comparison object is performed.

Figure 7:
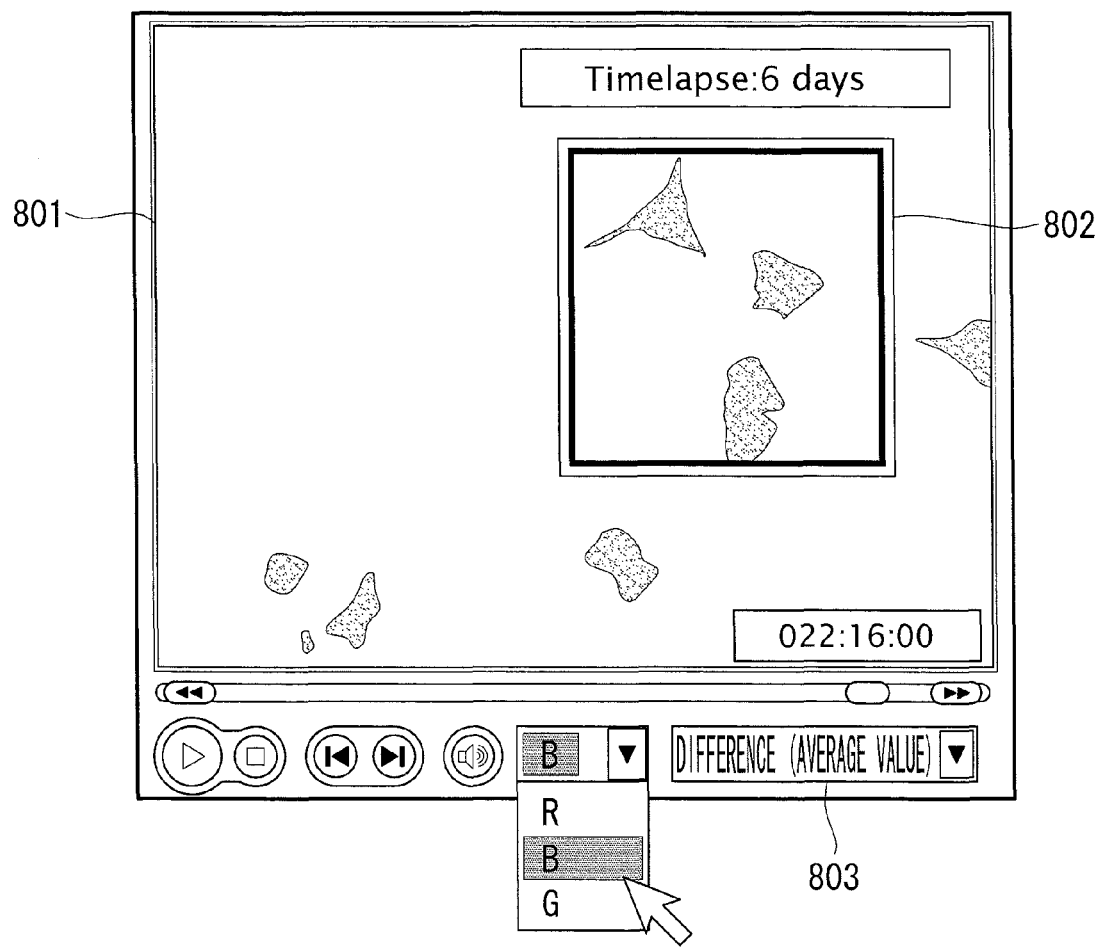
{FIG. 7}

Here, as shown in FIG. 7, the user sets a comparison object from a combo box 803 that shows comparison objects on an output screen 801 of the display section by means of a mouse as the comparison object setting section 612. In the example shown in FIG. 7, an average value of differences in a B value is set as the comparison object.

Next, in step S705, calculation of a change amount is performed.

Specifically, the change amount detection section 605 calculates a change amount of a region of interest 802 between the image data of an Nth frame and an N+1th frame. The change amount is calculated with respect to the comparison object that has been set with the comparison object setting section 612. That is, in the present embodiment, the change amount is the average value of differences in the B value.

Next, in step S706, it is determined whether or not the change amount satisfies a condition.

Here, the change determination section 606 determines whether the change amount detected by the change amount detection section 605 satisfies a previously set condition. If the change amount satisfies the condition, the processing moves to step S707. In contrast, if the condition is not satisfied, the processing moves to step S708. According to the present embodiment, since the comparison object is the average value of differences in the B value, for example, a condition that the average value of differences in the B value is greater than or equal to 50 or is less than or equal to 40 or the like can be considered, although the present invention is not limited thereto.

As described in the foregoing, according to the microscope system 3 that includes the image processing system according to the present embodiment, it is possible to arbitrarily set an object with which to perform a comparison in a region of interest on which the user is focusing attention, and an index can be added to image data of a frame in which a change in the comparison object satisfies a specific condition. As a result, image data of a frame that satisfies a specific condition can be automatically detected with high accuracy, and therefore efficient observation and assessment of a moving image can be performed.

{Fourth Embodiment}

Next, a microscope system including an image processing system according to a fourth embodiment of the present invention is described below referring to FIG. 8 to FIG. 10. Hereunder, with regard to a microscope system 4 of the present embodiment, a description of points that are common with the microscope systems of the respective embodiments described above is omitted, and differences with respect to the microscope systems of the foregoing embodiments are mainly described.

Figure 8:
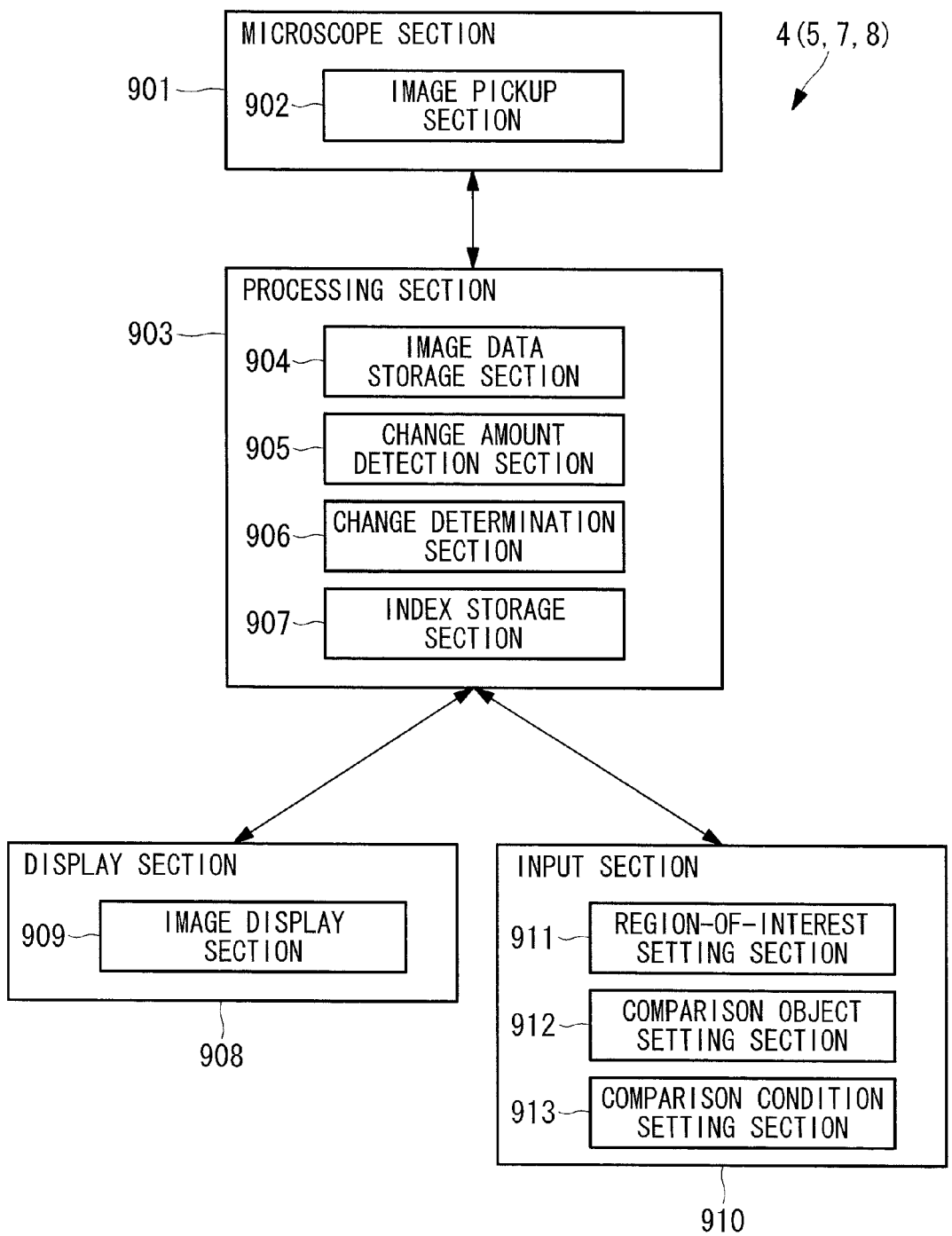
{FIG. 8}

As shown in FIG. 8, the configuration of the microscope system 4 of the present embodiment is approximately the same as the configuration of the microscope system 3 of the third embodiment (see FIG. 5). The differences between the microscope system 3 of the third embodiment and the microscope system 4 of the present embodiment are described below.

As shown in FIG. 8, in the microscope system 4 of the present embodiment, in addition to a region-of-interest setting section 911 and a comparison object setting section 912, an input section 910 has a comparison condition setting section (condition setting section) 913 that sets a comparison condition for a time of performing a determination at a change determination section 906.

For example, a keyboard, a mouse, a joystick or the like can be used as the comparison condition setting section 913, although the present invention is not limited thereto.

As an example of a comparison condition, when a comparison object is an average value of differences in a brightness value Y or RGB values, a condition that the average value of the differences is greater than or equal to 50, is less than or equal to 60, or is greater than or equal to 40 and less than or equal to 80 or the like can be considered as the comparison condition, although the present invention is not limited thereto. It is sufficient that the comparison condition is a condition that is suitable for the comparison object.

Operations of the microscope system 4 having the above configuration are described hereunder.

Figure 9:
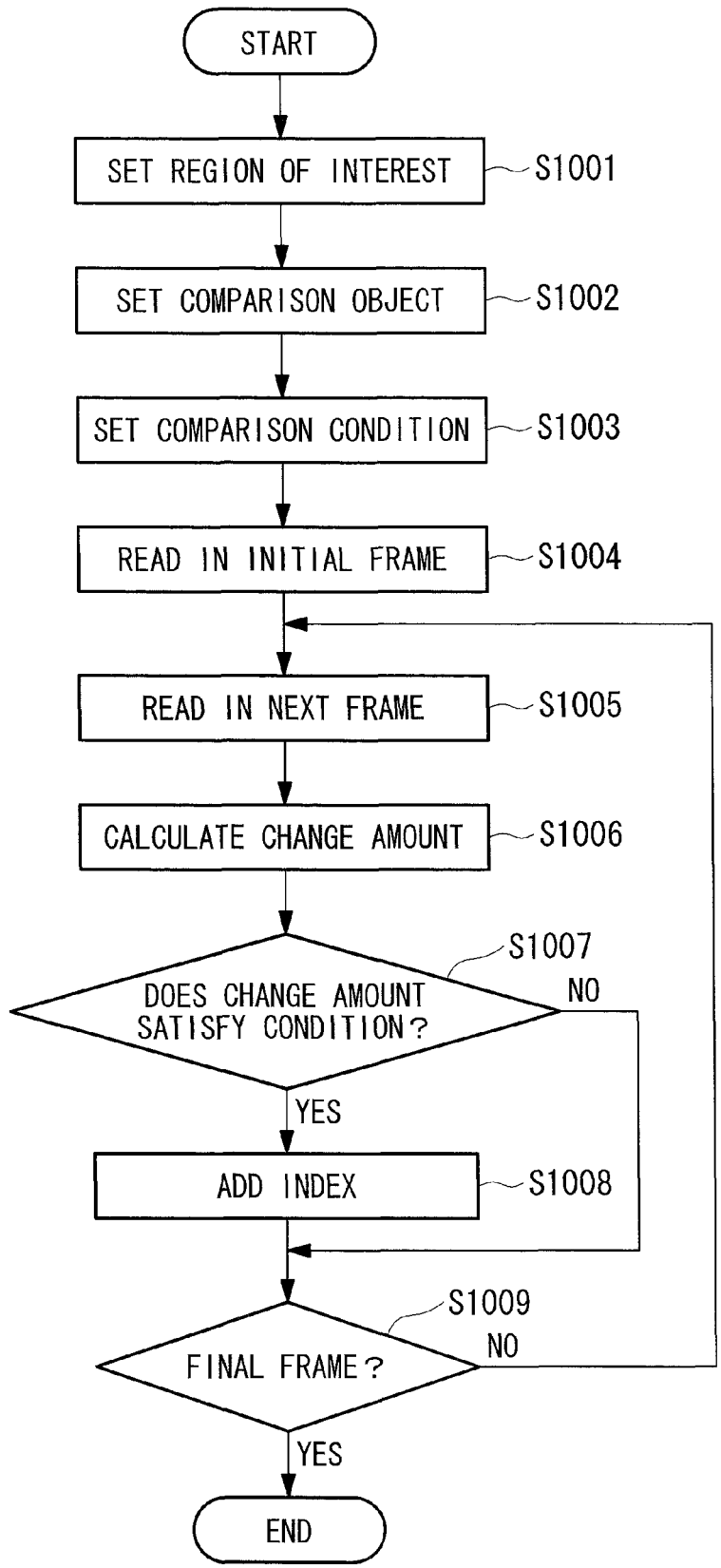
{FIG. 9}

FIG. 9 is a flowchart that illustrates processing that is executed in the microscope system of the present embodiment. Differences between the processing of the microscope system 4 of the present embodiment in this case and the processing executed by the microscope system 3 of the third embodiment (see FIG. 6) are described hereunder.

In step S1003, setting of a comparison condition is performed.

Figure 10:
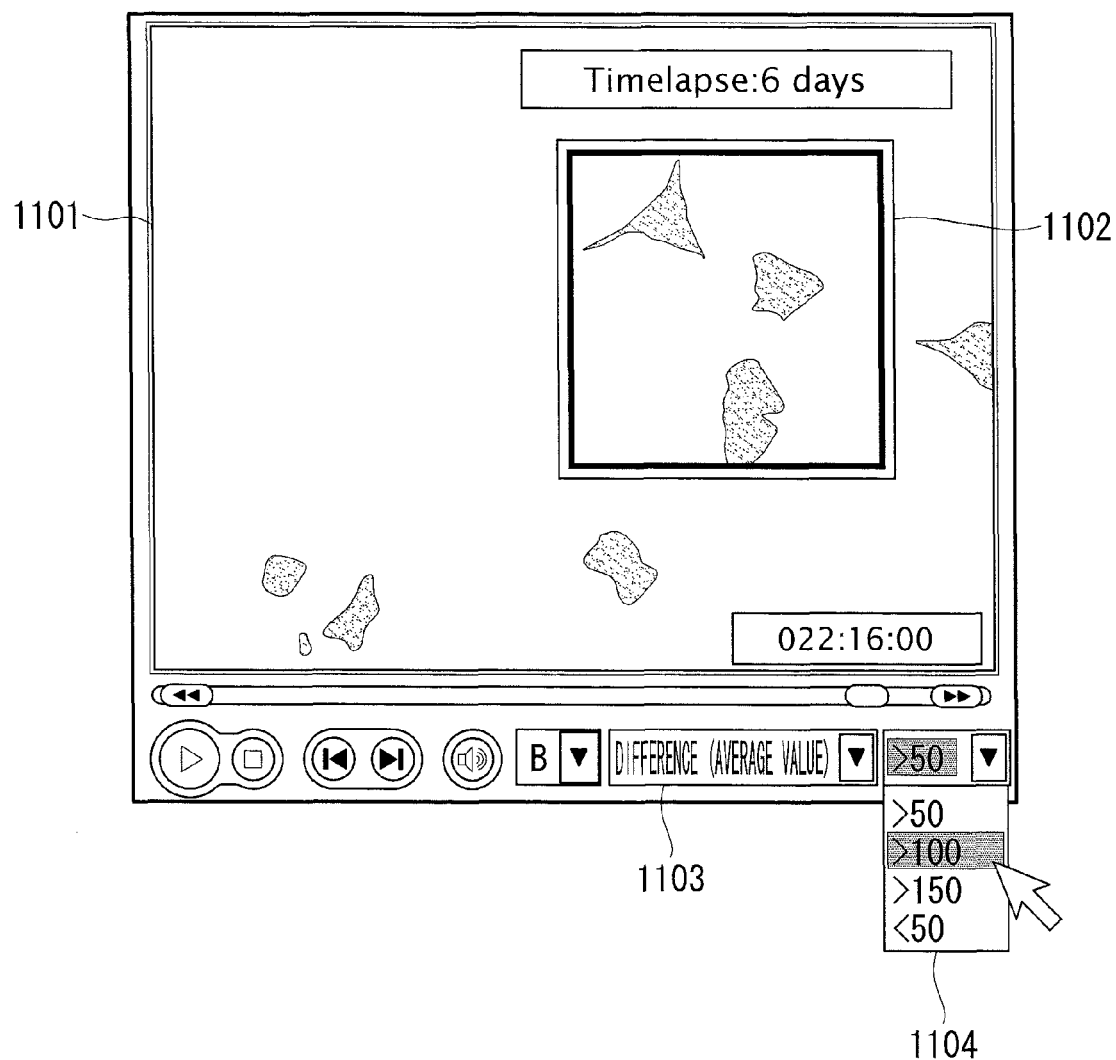
{FIG. 10}

Specifically, as shown in FIG. 10, the user sets a comparison condition from a combo box 1104 that shows comparison conditions on an output screen 1101 of a display section 908 by means of a mouse as the comparison condition setting section 913. In the example shown in FIG. 10, it is assumed that a condition that the value of the comparison object exceeds 100 is set as the comparison condition.

Subsequently, in step S1007, it is determined whether or not a change amount of the region of interest 1102 satisfies the condition.

In this case, the change determination section 906 determines whether the change amount calculated by a change amount detection section 905 satisfies the condition that has been set with the comparison condition setting section 913. If the change amount satisfies the condition, the processing moves to step S1008. In contrast, if the condition is not satisfied, the processing moves to step S1009.

As described in the foregoing, according to the microscope system 4 that includes the image processing system according to the present embodiment, a criterion (comparison condition) for determining that a change has occurred between image data of adjacent frames in a region of interest on which the user is focusing attention can be arbitrarily set, and an index can be added to image data of a frame in which a change has occurred. As a result, image data of a frame that a user wishes to focus attention on can be automatically detected with high accuracy and the detected image data can be displayed on the display section. It is thereby possible for the user to efficiently carry out observation and assessment of a moving image.

{Fifth Embodiment}

Figure 11:
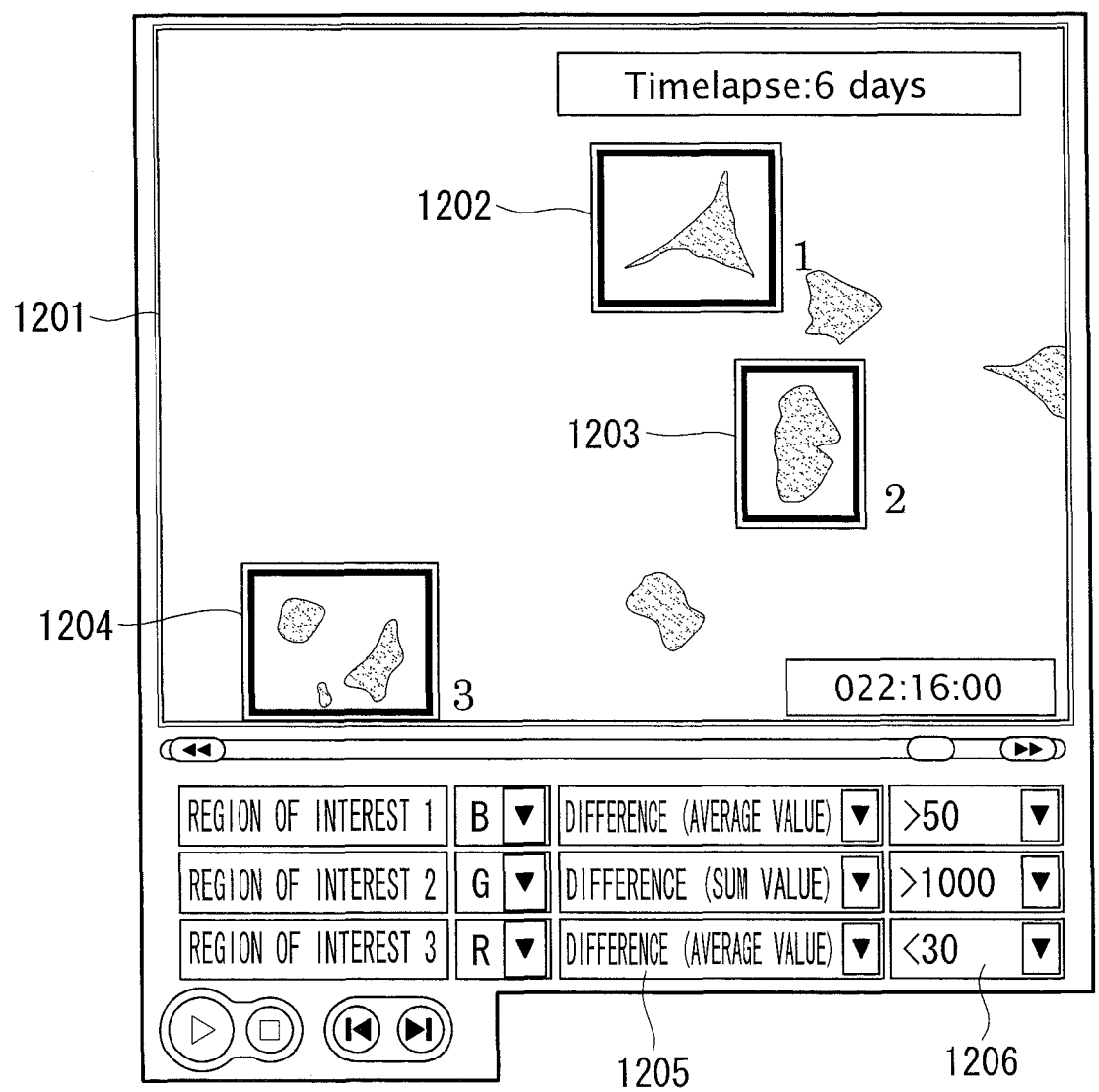
{FIG. 11}

Next, a microscope system including an image processing system according to a fifth embodiment of the present invention is described referring to FIG. 11. Hereunder, with regard to a microscope system 5 of the present embodiment, a description of points that are common with the microscope systems of the respective embodiments described above is omitted, and differences with respect to the microscope systems of the foregoing embodiments are mainly described.

The configuration of the microscope system 5 of the present embodiment is the same as the configuration of the microscope system 4 of the fourth embodiment, and hence the configuration of the microscope system 5 is as described above with reference to FIG. 8.

Further, since processing in the microscope system 5 of the present embodiment is approximately the same as the processing in the microscope system 4 of the fourth embodiment, only changes relative to the processing in the microscope system 4 of the fourth embodiment are described below with reference to FIG. 9.

According to the microscope system 5 of the present embodiment, in step S1002, comparison objects are set as described hereunder.

Here, as shown in FIG. 11, the user sets comparison objects from a combo box 1205 that shows comparison objects on an output screen 1201 of the display section 908 by means of a mouse as the comparison object setting section 912. At this time, the user sets a comparison object for each of a plurality of regions of interest 1202, 1203, and 1204. In the example shown in FIG. 11, a comparison object of a region of interest 1 is an average value of differences in a B value, a comparison object of a region of interest 2 is a sum value of differences in a G value, and a comparison object of a region of interest 3 is an average value of differences in an R value.

Next, in step S1003, setting of comparison conditions is performed.

Here, as shown in FIG. 11, the user sets comparison conditions from a combo box 1206 that shows comparison conditions on the output screen 1201 of the display section 908 by means of a mouse as the comparison condition setting section 913. At this time, the user sets a comparison condition for each of the plurality of regions of interest 1202, 1203, and 1204. In the example shown in FIG. 11, a comparison condition for the region of interest 1 is that the value of the comparison object exceeds 50, a comparison condition for the region of interest 2 is that the value of the comparison object exceeds 1000, and a comparison condition for the region of interest 3 is that the value of the comparison object is less than 30.

As described in the foregoing, according to the microscope system 5 that includes the image processing system according to the present embodiment, since a separate comparison object and a separate comparison condition can be set for each region of interest, automatic detection of a frame that satisfies a specific condition that a user wishes to focus attention on can be realized with higher accuracy than in the respective embodiments described above. It is thus possible for the user to efficiently carry out observation and assessment of a moving image.

{Sixth Embodiment}

Next, a microscope system including an image processing system according to a sixth embodiment of the present invention is described below referring to FIG. 12 to FIG. 14. Hereunder, with regard to a microscope system 6 of the present embodiment, a description of points that are common with the microscope systems of the respective embodiments described above is omitted, and differences with respect to the microscope systems of the foregoing embodiments are mainly described.

Figure 12:
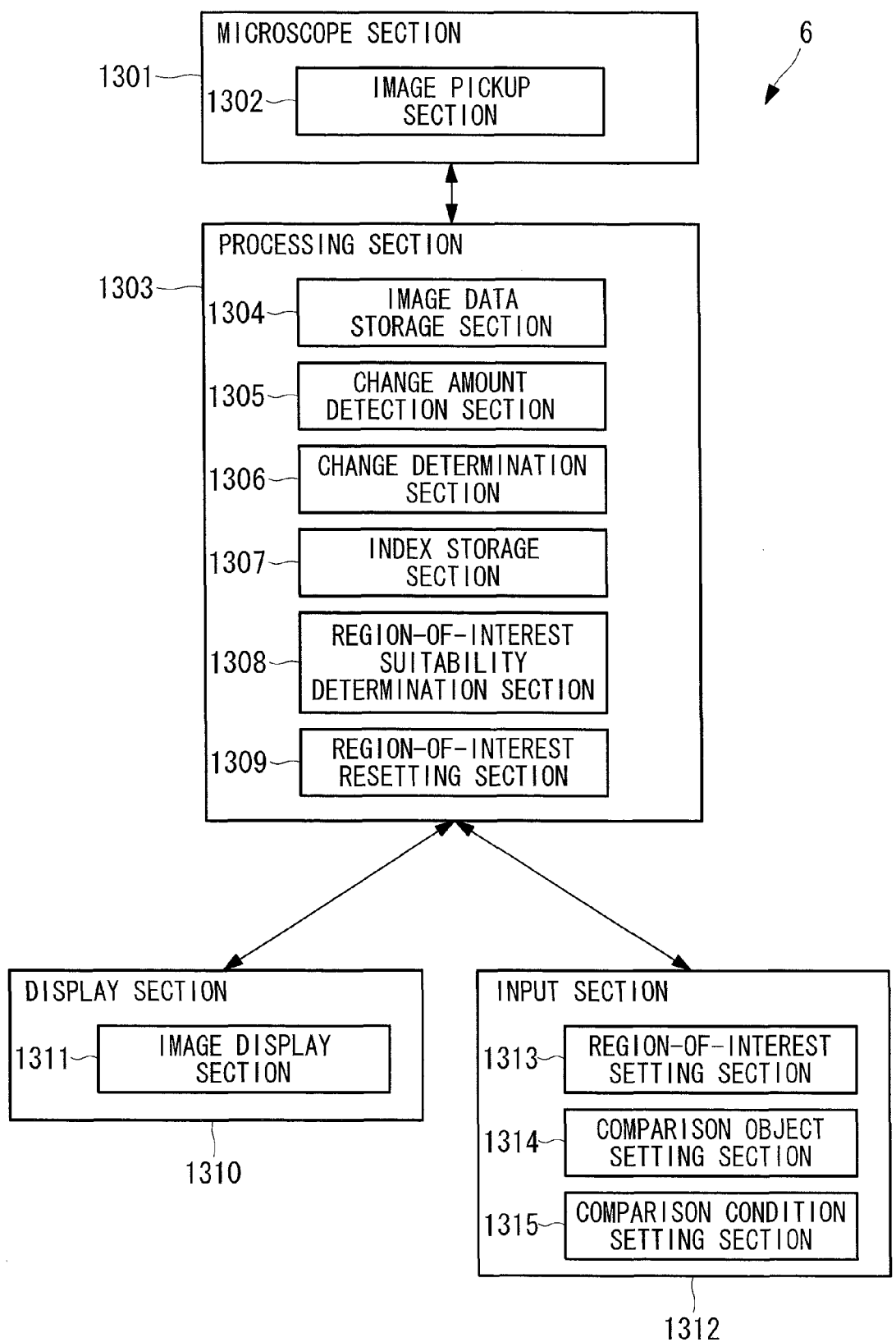
{FIG. 12}

As shown in FIG. 12, the configuration of the microscope system 6 of the present embodiment is approximately the same as the configuration of the microscope system 4 of the fourth embodiment (see FIG. 8). The differences between the microscope system 4 of the fourth embodiment and the microscope system 6 of the present embodiment are described below.

As shown in FIG. 12, in the microscope system 6 of the present embodiment, in addition to the configuration shown in FIG. 8, a processing section 1303 also includes a region-of-interest suitability determination section (suitability determination section) 1308 and a region-of-interest resetting section 1309.

The region-of-interest suitability determination section 1308 is configured to extract an edge of an object inside a region of interest that is set with a region-of-interest setting section 1313, and determine whether all of the extracted edge fits inside the region of interest without some of the edge lying outside the region of interest. In this connection, for example, a PC can be used as the region-of-interest suitability determination section 1308, although the present invention is not limited thereto.

The region-of-interest resetting section 1309 is configured so that, when the region-of-interest suitability determination section 1308 determines that all of the extracted edge does not fit inside the region of interest without some of the edge lying outside the region of interest, the region-of-interest resetting section 1309 resets the region of interest so that all of the edge fits inside the region of interest without any part thereof lying outside the region of interest. Although, for example, a PC can also be used as the region-of-interest resetting section 1309, the present invention is not limited thereto.

The operations of the microscope system 6 having the above configuration are described hereunder.

Figure 13:
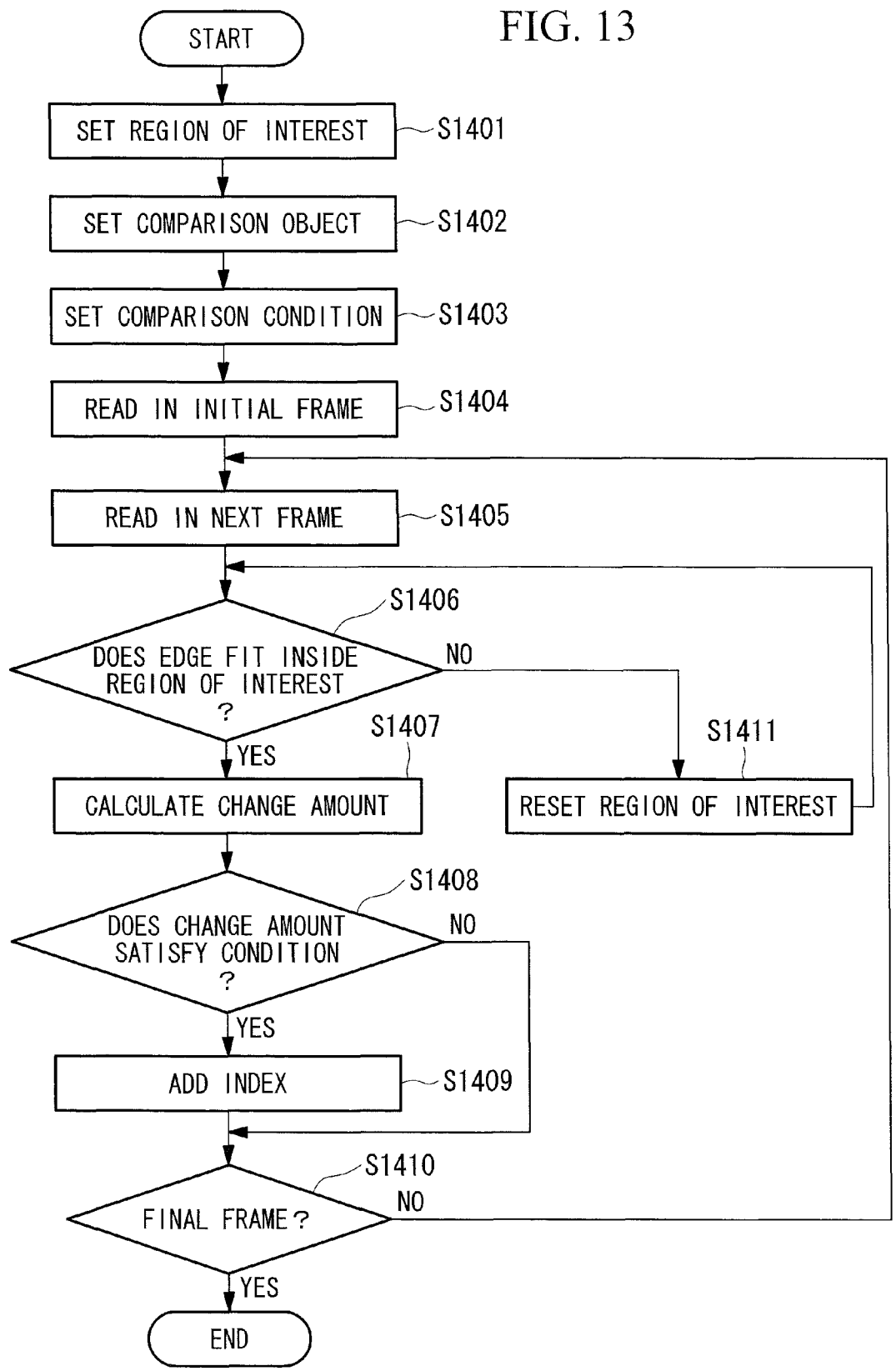
{FIG. 13}

FIG. 13 is a flowchart that illustrates processing that is executed in the microscope system of the present embodiment. Differences between the processing of the microscope system 6 of the present embodiment in this case and the processing executed by the microscope system 4 of the fourth embodiment (see FIG. 9) are described hereunder.

In step S1406, a determination is performed as to whether or not an observation object fits inside the region.

Although according to the present embodiment it is assumed that a change amount in this case is set as, for example, an amount of movement or an area of a cell, the present invention is not limited thereto. In this connection, the amount of movement of a cell is an amount of movement of the position of the center of gravity thereof that is determined from the edge, and the area of a cell can be calculated based on the edge.

An accurate comparison cannot be performed when the entire cell that is the object of interest is not included in the region of interest, that is, when the edge of the cell does not fit inside the region of interest without some of the edge lying outside the region of interest.

As an example, when the comparison object is the amount of movement of a cell, a case can be supposed in which the amount of movement of a cell is very large and the cell moves outside the specified region of interest. When the comparison object is the size of a cell, a case can be supposed in which the cell grows too large and extends to outside the specified region of interest.

The region-of-interest suitability determination section 1308 extracts the edge of an observation object by applying a differential filter to the inside of the region of interest of image data of frames that are read in. The region-of-interest suitability determination section 1308 then determines whether or not the extracted edge of the observation object fits inside the region of interest.

In this connection, although according to the present embodiment an example is described in which a differential filter is applied to image data as an edge extraction method, the present invention is not limited thereto, and any known technique such as use of a Sobel filter or a Prewitt filter may be applied.

Figure 14:
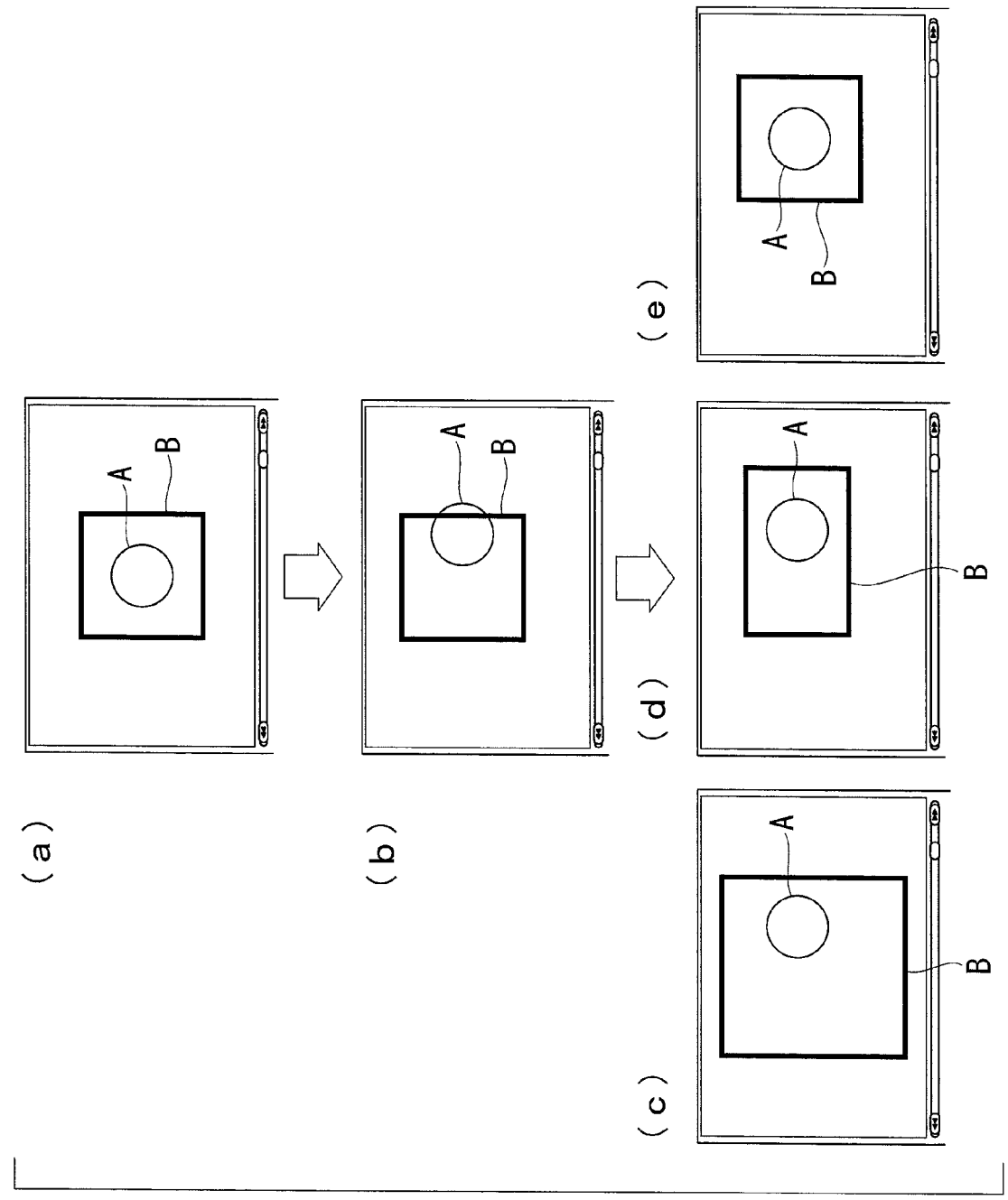
{FIG. 14}
Figure 15:
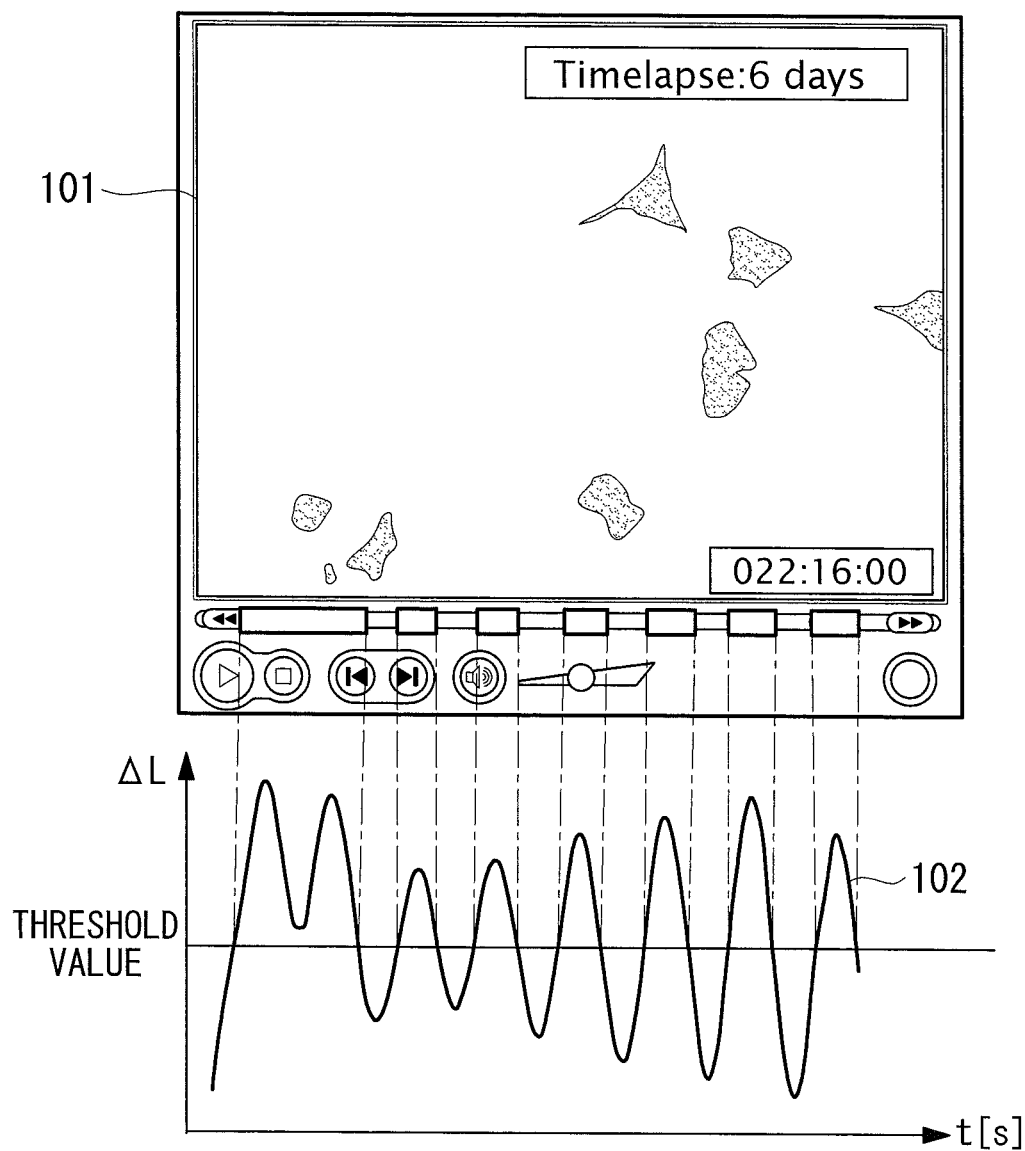
{FIG. 15}

As shown in FIG. 14(*a*), if an observation object A fits inside a region of interest B, the processing moves to step S1407. In contrast, as shown in FIG. 14(*b*), if the observation object A does not fit inside the region of interest B, the processing moves to step S1411.

Subsequently, in step S1411, resetting of the region of interest is performed.

The region-of-interest resetting section 1309 automatically changes the region of interest.

As an example, as shown in FIG. 14(*c*), the size of the region of interest B is enlarged by an arbitrary multiple based on the current center position of the region of interest B. Next, as shown in FIG. 14(*d*), the region of interest B is extended by an arbitrary size in a direction in which some of the edge lies outside the region of interest. Thereafter, as shown in FIG. 14(*e*), the position of the region of interest B is moved in an arbitrary direction with respect to the direction in which some of the edge lies outside the region of interest.

As described in the foregoing, according to the microscope system 6 that includes the image processing system according to the present embodiment, the suitability of a region of interest that is set by the region-of-interest setting section 1313 is determined by the region-of-interest suitability determination section 1308, and in accordance with a result determined thereby, the region of interest is reset to a new region of interest by the region-of-interest resetting section 1309. As a result, even in a case where, for example, the amount of movement or the amount of growth of an observation object is large and the observation object has moved or extended to outside a region of interest that was initially set, the region of interest can be reset to a new region of interest that includes the observation object. Thus, image data of a frame that a user wishes to focus attention on can be automatically detected with high accuracy and the detected image data can be displayed on the display section. It is thus possible for the user to efficiently carry out observation and assessment of a moving image.

{Seventh Embodiment}

Next, a microscope system including an image processing system according to a seventh embodiment of the present invention is described below referring to FIG. 8 to FIG. 10. Hereunder, with regard to a microscope system 7 of the present embodiment, a description of points that are common with the microscope systems of the respective embodiments described above is omitted, and differences with respect to the microscope systems of the foregoing embodiments are mainly described.

The configuration of the microscope system 7 of the present embodiment is the same as in the configuration diagram of the microscope system 4 of the fourth embodiment, and hence the configuration of the microscope system 7 is as described above with reference to FIG. 8.

Further, since processing in the microscope system 7 of the present embodiment is approximately the same as the processing in the microscope system 4 of the fourth embodiment, only changes relative to the processing in the microscope system 4 of the fourth embodiment are described hereunder with reference to FIG. 9.

In the microscope system 7 of the present embodiment, in step S1005, the next frame is read in as described below.

In addition to image data of the frame (Nth) that has already been read out, the change amount detection section 905 reads in image data of a frame (N+Mth) after the Nth frame. Here, M is an arbitrary integer such as 2 or 3.

Next, in step S1006, calculation of a change amount is performed.

The change amount detection section 905 calculates a change amount of the region of interest between the image data of the Nth frame and the N+Mth frame that have been read in.

Although according to the present embodiment the image data of a frame (N+Mth) that is after the Nth frame is read in and a comparison is performed, the present invention is not limited thereto. For instance, a configuration may be adopted in which, in addition to the image data of the frame (Nth) that has already been read out, the image data of a plurality of frames (N+Mth) and (N+Lth) that are after the Nth frame is read in and a comparison is performed. Here, M and L are arbitrary integers such as 2 or 3. A configuration may also be adopted in which the image data of the Nth frame that has been read in is compared with an arbitrary image that the user specifies.

As described in the foregoing, according to the microscope system 7 that includes the image processing system according to the present embodiment, by not limiting a frame that is the object for comparison to the next frame, automatic detection of a frame that satisfies a specific condition which the user wishes to focus attention on can be performed with higher accuracy than in the respective embodiments described above. It is thus possible for the user to efficiently carry out observation and assessment of a moving image.

{Eighth Embodiment}

Next, a microscope system including an image processing system according to an eighth embodiment of the present invention is described below referring to FIG. 8 to FIG. 10. Hereunder, with regard to a microscope system 8 of the present embodiment, a description of points that are common with the microscope systems of the respective embodiments described above is omitted, and differences with respect to the microscope systems of the foregoing embodiments are mainly described.

The configuration of the microscope system 8 of the present embodiment is the same as in the configuration diagram of the microscope system 4 of the fourth embodiment, and hence the configuration of the microscope system 8 is as described above with reference to FIG. 8.

Further, since processing in the microscope system 8 of the present embodiment is approximately the same as the processing in the microscope system 4 of the fourth embodiment, only changes relative to the processing in the microscope system 4 of the fourth embodiment are described hereunder with reference to FIG. 9.

According to the microscope system 8 of the present embodiment, in step S1002, comparison objects are set as described below.

Although according to the microscope system 4 of the fourth embodiment a single comparison object is set with respect to a single region of interest, according to the microscope system 8 of the present embodiment, a plurality of comparison objects is set with respect to a single region of interest. Although an average value of differences in B and an average value of differences in G may be mentioned as specific examples of comparison objects, the present invention is not limited thereto.

Next, in step S1003, comparison conditions are set.

Here, conditions are individually set by means of the comparison condition setting section 913 with respect to the comparison objects that have been set in step S1002.

Although a condition that an average value of differences in B is greater than or equal to 100 and a condition that an average value of differences in G is greater than or equal to 150 may be mentioned as specific examples of comparison conditions, the present invention is not limited thereto.

As described in the foregoing, according to the microscope system 8 that includes the image processing system according to the present embodiment, by setting a plurality of comparison objects and conditions for a region of interest, automatic detection of a frame that satisfies a specific condition which the user wishes to focus attention on can be performed with higher accuracy that in each of the foregoing embodiments. It is thus possible for the user to efficiently carry out observation and assessment of a moving image.

While various embodiments of the present invention are described in detail above with reference to the drawings, the specific constitution of the present invention is not limited to the above embodiments, and also encompasses design changes or the like within a range that does not depart from the spirit of the present invention. For example, application of the present invention is not limited to the respective embodiments that are described above, and the present invention may also be applied to an embodiment in which the above embodiments are suitably combined, and application thereof is not particularly limited.

{Reference Signs List}

1, 2, 3, 4, 5, 6, 7, 8 Microscope system
200 Processing section
201 Microscope section
202 Image pickup section
203 Image data storage section
204 Change amount detection section
205 Change determination section (Determination section)
206 Index storage section
207 Display section
208 Image display section
209 Input section
210 Region-of-interest setting section
612 Comparison object setting section
913 Comparison condition setting section (Condition setting section)
1308 Region-of-interest suitability determination section (Suitability determination section)
1309 Region-of-interest resetting section

The invention claimed is:

1. An image processing system comprising:
at least one processor comprising hardware, the at least one processor implementing:
a region-of-interest setting section that sets a region of interest in a first image frame and a second image frame adjacent to the first image frame, the first and second image frames being a part of a plurality of consecutive image frames;
a change amount detection section that compares the region of interest of the second image frame, the second image frame being a current image frame, with the region of interest of the first image frame, and detects a change amount between the region of interest of the current image frame and the region of interest of the first image frame;
a determination section that determines that the change amount that is detected by the change amount detection section exceeds a predetermined threshold value; and
an index storage section that stores the current image frame and adds an index to the stored current image frame.

2. The image processing system according to claim 1, wherein:
the region-of-interest setting section sets the region of interest as a first region of interest and another region of interest as a second region of interest; and
the change amount detection section
compares the first region of interest of the second image frame with the first region of interest of the first image frame,
detects a first change amount between the first region of interest of the second image frame and the first region of interest of the first image frame,
compares the second region of interest of the second image frame with the second region of interest of the first image frame,
detects a second change amount between the second region of interest of the second image frame and the second region of interest of the first image frame, and
the determination section determines that the first change amount exceeds a first predetermined threshold value, the second change amount exceeds a second predetermined threshold value, or both, and
the index storage section stores the second image frame and adds an index to the stored second image frame.

3. The image processing system according to claim 1, wherein the at least one processor further implements:
a comparison object setting section that sets an object with which to perform a comparison in the change amount detection section.

4. The image processing system according to claim 1, wherein the at least one processer further implements:
    a condition setting section that sets the predetermined threshold value that serves as a criterion for determination in the determination section.

5. The image processing system according to claim 1, wherein the at least one processor further implements:
    a suitability determination section that determines a suitability of the region of interest that is set by the region-of-interest setting section; and
    a region-of-interest resetting section that resets the region of interest according to a determination result of the suitability determination section.

6. An image processing method comprising:
    at least one processor comprising hardware, executing:
        a region of interest setting step of setting a region of interest in a first image frame and a second image frame adjacent to the first image frame, the first and second image frames being a part of a plurality of consecutive image frames;
        a change amount detection step of comparing the region of interest of the second image frame, the second image frame being a current image frame, with the region of interest of the first image frame, and detecting a change amount between the region of interest of the current image frame and the region of interest of the first image frame;
        a determination step of determining that the change amount that is detected in the change amount detection step exceeds a predetermined threshold value; and
        an index storage step of storing the current image frame and adding an index to the stored current image frame.

* * * * *